(12) United States Patent
Morita

(10) Patent No.: US 8,590,676 B2
(45) Date of Patent: Nov. 26, 2013

(54) FLUID PRESSURE SHOCK ABSORBER

(75) Inventor: Yuji Morita, Gifu (JP)

(73) Assignee: Kayaba Industry Co., Ltd., Tokyo (JP)

( * ) Notice: Subject to any disclaimer, the term of this patent is extended or adjusted under 35 U.S.C. 154(b) by 253 days.

(21) Appl. No.: 12/923,194

(22) Filed: Sep. 8, 2010

(65) Prior Publication Data

US 2011/0056781 A1 Mar. 10, 2011

(30) Foreign Application Priority Data

Sep. 10, 2009 (JP) ................................. 2009-208865

(51) Int. Cl.
*F16F 9/52* (2006.01)
(52) U.S. Cl.
USPC ............ 188/276; 188/314; 188/317; 188/318
(58) Field of Classification Search
USPC ......... 188/276, 313, 316, 317, 318, 320, 277; 267/64.15, 64.16, 64.17, 195, 217, 218
See application file for complete search history.

(56) References Cited

U.S. PATENT DOCUMENTS

| | | | | |
|---|---|---|---|---|
| 2,909,248 A * | 10/1959 | Gies | ............................. | 188/277 |
| 3,960,251 A * | 6/1976 | Gorissen | ....................... | 188/318 |
| 5,139,119 A * | 8/1992 | Karnopp | .................... | 188/282.2 |
| 5,152,379 A * | 10/1992 | Sackett et al. | ................ | 188/320 |
| 5,775,677 A * | 7/1998 | Englund | ....................... | 188/317 |
| 6,085,877 A * | 7/2000 | Robinson et al. | ............. | 188/317 |
| 6,918,472 B2 * | 7/2005 | Dernebo | ....................... | 188/313 |

FOREIGN PATENT DOCUMENTS

| | | | |
|---|---|---|---|
| JP | 04034237 A | * | 2/1992 |
| JP | 2001-165224 A | | 6/2001 |
| JP | 2001-248679 A | | 9/2001 |
| JP | 2007-132389 A | | 5/2007 |

OTHER PUBLICATIONS

Translation, JP 2001-248679 (Nagai), Hydraulic Shock Absorber, Sep. 14, 2001.*

* cited by examiner

*Primary Examiner* — Thomas J Williams
(74) *Attorney, Agent, or Firm* — Rabin & Berdo, P.C.

(57) ABSTRACT

A piston (8) of a fluid pressure shock absorber (D, D1) partitions a first fluid chamber (R1) and a second fluid chamber (R2) in a cylinder (5) filled with a fluid. A pipe member (3) inserted into a housing (2, 30) has a connection to one of the first fluid chamber (R1) and the second fluid chamber (R2). The housing (2, 30) and the pipe member (3) form a space (4) there-between that connects the other of the first fluid chamber (R1) and the second fluid chamber (R2) to the pipe member (3). The pipe member (3) and the space (4) form a long fluid path between the first fluid chamber (R1) and the second fluid chamber (R2). The shock absorber (D, D1) thereby generates a damping force proportional to the stroke speed of the piston (8).

11 Claims, 4 Drawing Sheets

FLUID PRESSURE SHOCK ABSORBER

FIELD OF THE INVENTION

This invention relates to a damping mechanism provided in a fluid pressure shock absorber.

BACKGROUND OF THE INVENTION

A hydraulic shock absorber for a vehicle comprises, for example, a piston delimiting two oil chambers in a cylinder, an oil passage penetrating the piston to connect the two oil chambers, and a damping valve. The damping valve may be constituted by a laminated leaf valve provided in an outlet of the oil passage.

When the piston strokes in the cylinder, the respective oil chambers expand and contract and working oil flows through the oil passage. Accompanying this action, the damping valve generates a damping force attributed to a flow resistance that the damping valve exerts on the working oil, thereby damping a shock or oscillation input into the shock absorber.

Since the laminated leaf valve remains in a closed state until a predefined opening pressure is achieved, the damping force generated when a piston stroke speed is in a low piston stroke speed region may become excessively large. Considering the riding comfort of the vehicle, it is preferable to cause the generated damping force to vary in a linear fashion with respect to the piston stroke speed especially in the low piston stroke speed region.

With respect to damping force characteristics of a shock absorber in a low piston speed region, JP2001-165224 A, published by the Japan Patent Office in 2001, proposes laminating sub-leaf valves having notches and holes on a leaf valve. JP2007-132389 A, published by the Japan Patent Office in 2007, proposes small diameter chokes penetrating a piston so as to bypass the laminated leaf valve, thereby improving the damping force characteristics in the low stroke speed region.

SUMMARY OF THE INVENTION

The former proposal utilizes a laminated leaf valve comprising a leaf valve, a sub-leaf valve in which holes are formed, and a sub-leaf valve in which notches are formed. As a result, the structure of the damping valve becomes complicated, leading to an increase in the production cost of the hydraulic shock absorber.

With respect to the latter proposal, the chokes penetrating the piston have a relatively short passage length and a small cross-sectional area. When the piston stroke speed is high, therefore, it is difficult to obtain linear damping force characteristics proportional to the piston stroke speed that are specific to a choke. Damping force characteristics increasing in second order with respect to the piston stroke speed which are similar to the characteristics of an orifice may appear in the high piston stroke speed region. Accordingly, the chokes must be used with a laminated leaf valve that opens in a high piston stroke speed region. This also makes the production cost of the hydraulic shock absorber high.

Both proposals require a laminated leaf valve. When, for example, a vehicle runs over an undulation, a transient oscillation is input into the shock absorber. The laminated leaf valve may respond with an brief moment of delay in such a case resulting in a generation of an excessive damping force.

It is therefore an object of this invention to provide a shock absorber that generates a damping force proportional to a piston speed without using a laminated leaf valve.

To achieve the above object, this invention provides a fluid pressure shock absorber comprising a cylinder filled with a fluid, a piston that is accommodated in the cylinder so as to be free to slide and partitions a first fluid chamber and a second fluid chamber in the cylinder, a housing, and a pipe member inserted into the housing. The pipe member has a connection to one of the first fluid chamber and the second fluid chamber. The housing and the pipe member form a space there-between to connect the other of the first fluid chamber and the second fluid chamber to the pipe member.

The fluid pressure shock absorber according to this invention generates a damping force attributed to a frictional resistance of the fluid passage, and hence, a damping force which is proportional to a fluid flow rate of the fluid passage, or in other words proportional to a piston stroke speed. Further, since the fluid pressure shock absorber according to this invention does not require a valve body that normally closes a passage, an instantaneous increase in the damping force due to an opening delay of the valve does not occur. It achieves therefore a high response while maintaining a simple structure that decreases the manufacturing cost.

The details as well as other features and advantages of this invention are set forth in the remainder of the specification and are shown in the accompanying drawings.

DESCRIPTION OF THE PREFERRED EMBODIMENTS

Figure 1:
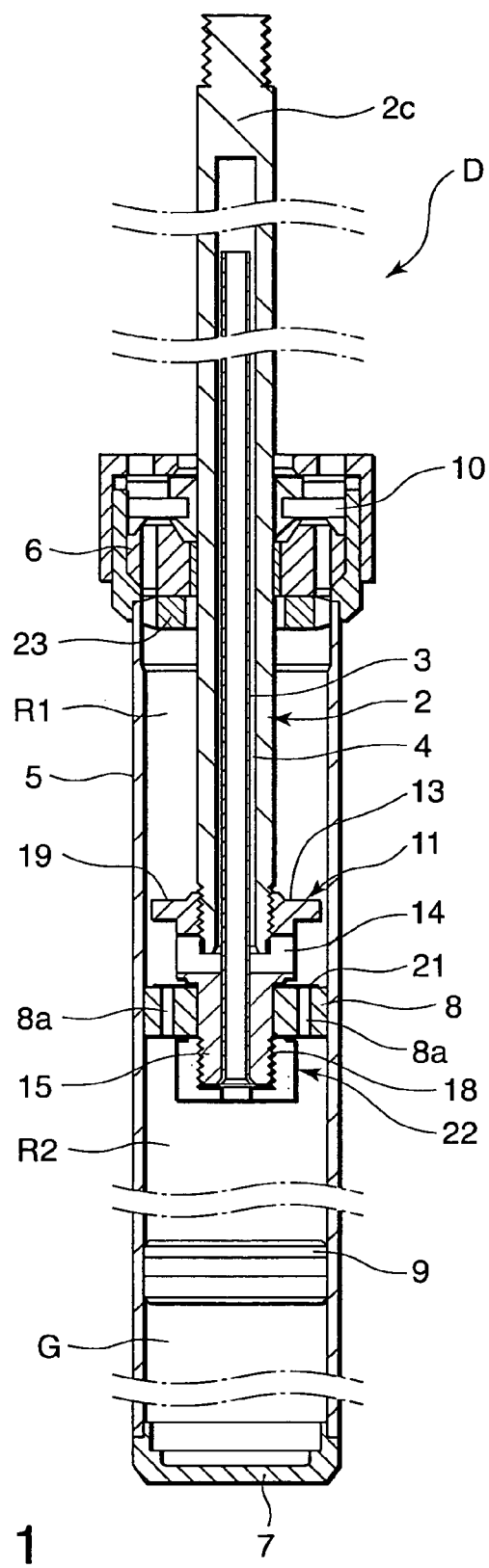
FIG. 1 is a longitudinal sectional view of a hydraulic shock absorber according to this invention.

Referring to FIG. 1 of the drawings, a fluid pressure shock absorber D provided for a vehicle suspension system comprises a piston 8 accommodated in a cylinder 5 so as to be free to slide and a piston rod 2 connected to the piston 8 and projecting in an axial direction from the cylinder 5.

The cylinder 5 is filled with working oil. The inner space of the cylinder 5 is separated into a first oil chamber R1 and a second oil chamber R2 by the piston 8. The first oil chamber R1 is formed around the piston rod 2 and the second oil chamber R2 is formed on the opposite side of the piston 8 to the piston rod 2.

A gas chamber G is further formed in the cylinder 5 between the second oil chamber R2 and a cap 7 closing a lower end of the cylinder 5. The second oil chamber R2 and the gas chamber G are separated by a free piston 9 fitted to the inner periphery of the cylinder 5 so as to be free to slide axially. The gas chamber G elongates and contracts in accordance with a variation in an invasion volume of the piston rod 2 into the cylinder 5, thereby compensating for a space volume change in the cylinder 5.

It is also possible to provide a reservoir to store working oil to compensate for the space volume change in the cylinder. When a compressive gas is used as the fluid for filling the cylinder 5 instead of the non-compressive working oil, the reservoir or the gas chamber may be omitted because volume variation in the gas compensates for the space volume change in the cylinder 5.

The piston rod 2 projects in the axial direction from the cylinder 5 via a rod guide 6 fixed to an upper end of the cylinder 5. A seal member 10 is fitted to the rod guide 6 to allow the piston rod 2 to slide thereon, thereby preventing the working oil from escaping to outside.

Figure 2:
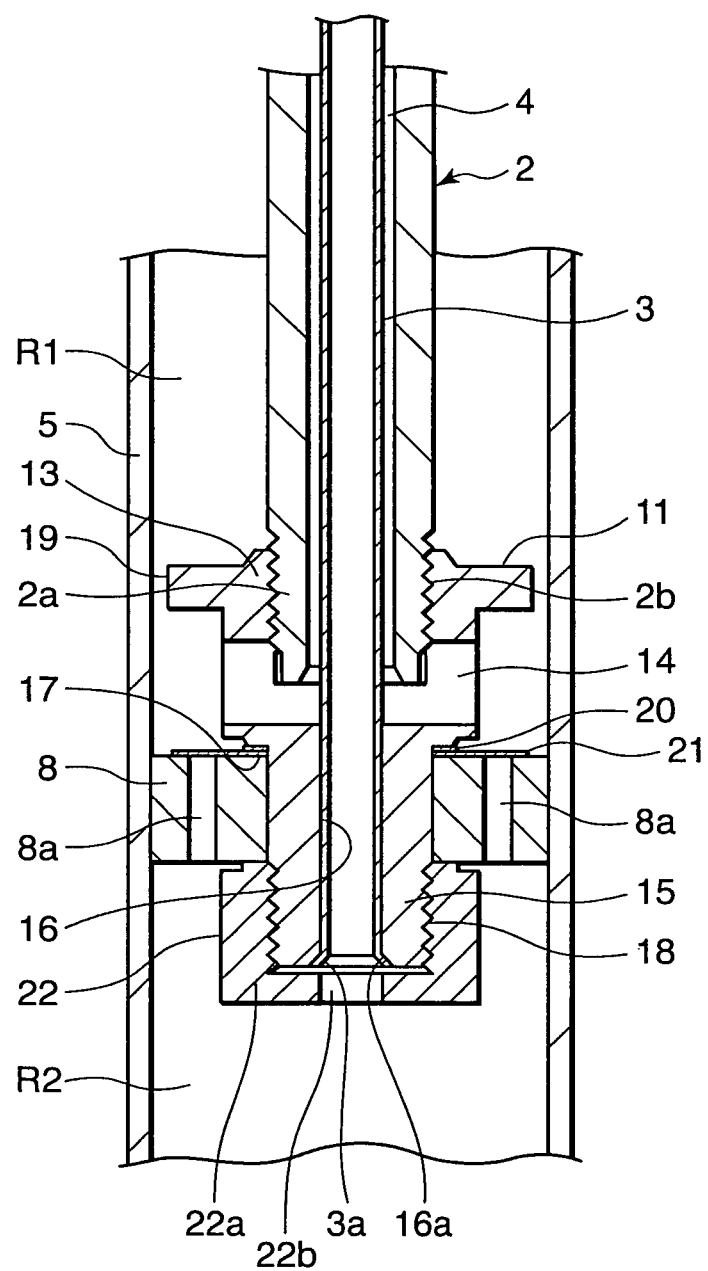
FIG. 2 is a longitudinal sectional view of essential parts of the hydraulic shock absorber.

Referring to FIG. 2, the piston 8 is formed in the shape of a disk and fixed to a tip 2a of the piston rod 2 via a holder 11.

The piston rod 2 is formed in a hollow shape and has a male screw 2b formed on the tip 2a such that a base 13 of the holder 11 is screwed on it. The base 13 has a flange 19. A tip 15 of the holder 11 penetrates the piston 8. The tip 15 has a male screw 18 on which a cap nut 22 is secured so as to fix the piston 8 to the piston rod 2 via the holder 11.

A pipe member 3 is inserted into the hollow piston rod 2 via the holder 11. The pipe member 3 is formed from a material having a greater coefficient of linear expansion than the piston rod 2 and, when inserted into the piston rod 2, forms a space 4 having a ring-shaped cross-section between the piston rod 2 and the pipe member 3.

The pipe member 3 penetrates a fitting hole 16 formed axially through the center of the holder 11 so as to be free to slide, and projects into the inner space of the piston rod 2 from below.

Referring again to FIG. 1, a projecting end of the pipe member 3 projecting into the piston rod 2 opens onto the space 4 in an upper part of the piston rod 2. An adequate space is set between the projecting end of the pipe member 3 and a base 2c of the piston rod 2 so as not to interrupt working oil flow between the inner space of the pipe member 3 and the space 4.

Referring again to FIG. 2, a tapered portion 16a that enlarges downwards is formed in a lower end of the fitting hole 16 of the pipe member 3. A lower end 3a of the pipe member 3 also has a tapered portion 16a that enlarges downwards. By making the lower end 3a and the tapered portion 16a fit each other, the pipe member 3 is prevented from being pulled upward out the holder 11.

A through-hole 22b is formed axially through a center of the cap nut 22. By making a diameter of the through-hole 22b smaller than an outer diameter of the pipe member 3, the pipe member 3 is prevented from dropping off the holder 11. A minute gap is preferably formed between a bottom 22a of the cap nut 22 and the lower end 3a of the pipe member 3 in a state where the cap nut 22 is secured onto the male screw 18. Further, an inner diameter of the fitting hole 16 is preferably set to be slightly greater than an outer diameter of the pipe member 3. According to this arrangement, the pipe member 3 is allowed to move in an axial direction and a radial direction with respect to the piston rod 2.

When the pipe member 3 becomes eccentric with respect to the piston rod 2 as the working oil passes through the space 4, a pressure distribution on the pipe member 3 in a radial direction becomes non-uniform. By allowing a minute displacement of the pipe member 3 in a radial direction with respect to the piston rod 2, the pipe member 3 is centered in the piston rod 2 by a differential pressure generated by the non-uniform pressure distribution. Accordingly, the space 4 always has a uniform cross-section with which a stable damping force is generated in the oil passage constituted by the pipe member 3 and the space 4.

A port 14 is formed in a radial direction in the holder 11 above the piston 8. The port 14 connects the first oil chamber R1 and the space 4 permanently.

A plurality of passages 8a penetrating the piston 8 axially is arranged in the piston 8 at regular angular intervals in a circumferential direction. The passages 8a is connected to the second oil chamber R2 permanently. A leaf valve 21 is disposed to close outlets of the passages 8a facing the first oil chamber R1.

The leaf valve 21 is constituted by a single disk-shaped leaf and has a center portion gripped by a piston 8 and a step 17 formed in the holder 11 via a washer 20. The leaf valve 21, when seated on an outer peripheral part on the piston 8, closes the outlets of the passages 8a facing the first oil chamber R1. The leaf valve 21 maintains the passages 8a in a closed state when the piston 8 moves upward in the figure or when the hydraulic shock absorber strokes in an elongation direction.

When the piston 8 moves downward in the figure, or when the hydraulic shock absorber strokes in a contraction direction, an outer peripheral part of the leaf valve 21 deforms upward according to a differential pressure between an oil pressure in the second oil chamber R2 that is led through the passages 8a and an oil pressure in the first oil chamber R1, thereby connecting the passages 8a to the first oil chamber R1.

The hydraulic shock absorber D provided for the vehicle suspension system requires a smaller damping force in a contraction stroke than in an elongation stroke. As the leaf valve 21 opens the passages 8a only in the contraction stroke and causes the passages 8a to function as a bypass passage, a generated damping force is set to be smaller in the contraction stroke than in the elongation stroke. Preferably, the leaf valve 21 is not preloaded so that the leaf valve 21 opens as soon as the pressure in the second oil chamber R2 becomes greater than the pressure in the first oil chamber R1.

Referring again to FIG. 1, a cushion 23 is fitted to a bottom face of the rod guide 6 to come into contact with the flange 19 of the holder 11 at an elongation stroke end of the hydraulic shock absorber D, thereby mitigating a shock generated when the holder 11 collides against the rod guide 6.

According to the construction described above, the first oil chamber R1 and the second oil chamber R2 are connected permanently to each other via a long distance passageway constituted by the port 14, the space 4 having a ring-shaped cross-section, a pipe member 3, and the through-hole 22b. This passageway allows working oil to flow between the first oil chamber R1 and the second oil chamber R2 at a flow velocity corresponding to a stroke speed of the piston 8 under a frictional resistance proportional to the flow velocity. This frictional resistance generates damping force in the hydraulic shock absorber D as it elongates and contracts.

In the elongation stroke of the hydraulic shock absorber D, the piston 8 moves upward in the figure, the first oil chamber R1 contracts, and the second oil chamber R2 expands. The working oil in the first oil chamber R1 flows from the port 14 through the space 4 having a ring-shaped cross-section on the inner side of the piston rod 2 to the inner space of the pipe member 3 via the upper end thereof, and then flows into the second oil chamber R2 from the lower end 3a of the pipe member 3 via the through-hole 22b. In the elongation stroke, the leaf valve 21 maintains the passages 8a in a closed state.

Accordingly, movement of the working oil from the first oil chamber R1 to the second oil chamber R2 is performed exclusively via the space 4 and the pipe member 3. In the cylinder 5, an excess space corresponding to the volume by which the piston rod 2 withdraws from the cylinder 5 is generated, but this capacity variation is compensated for by the gas chamber G that expands while raising the free piston 9.

With respect to the working oil flow accompanying the elongation stroke of the hydraulic shock absorber D, the space 4 and the pipe member 3 forms a long distance oil passage. An energy loss that this oil passage generates in the working oil is roughly a sum of an energy loss generated when working oil flows through the pipe member 3 and an energy loss generated when working oil flows through the space 4.

These energy losses are mainly generated by friction, and the energy loss accompanying the working oil flow in the oil passage is proportional to the flow velocity of the working oil. The flow rate in the oil passage is a value at which the sum of the energy loss equals a differential pressure between the first oil chamber R1 and the second oil chamber R2.

Figure 3:
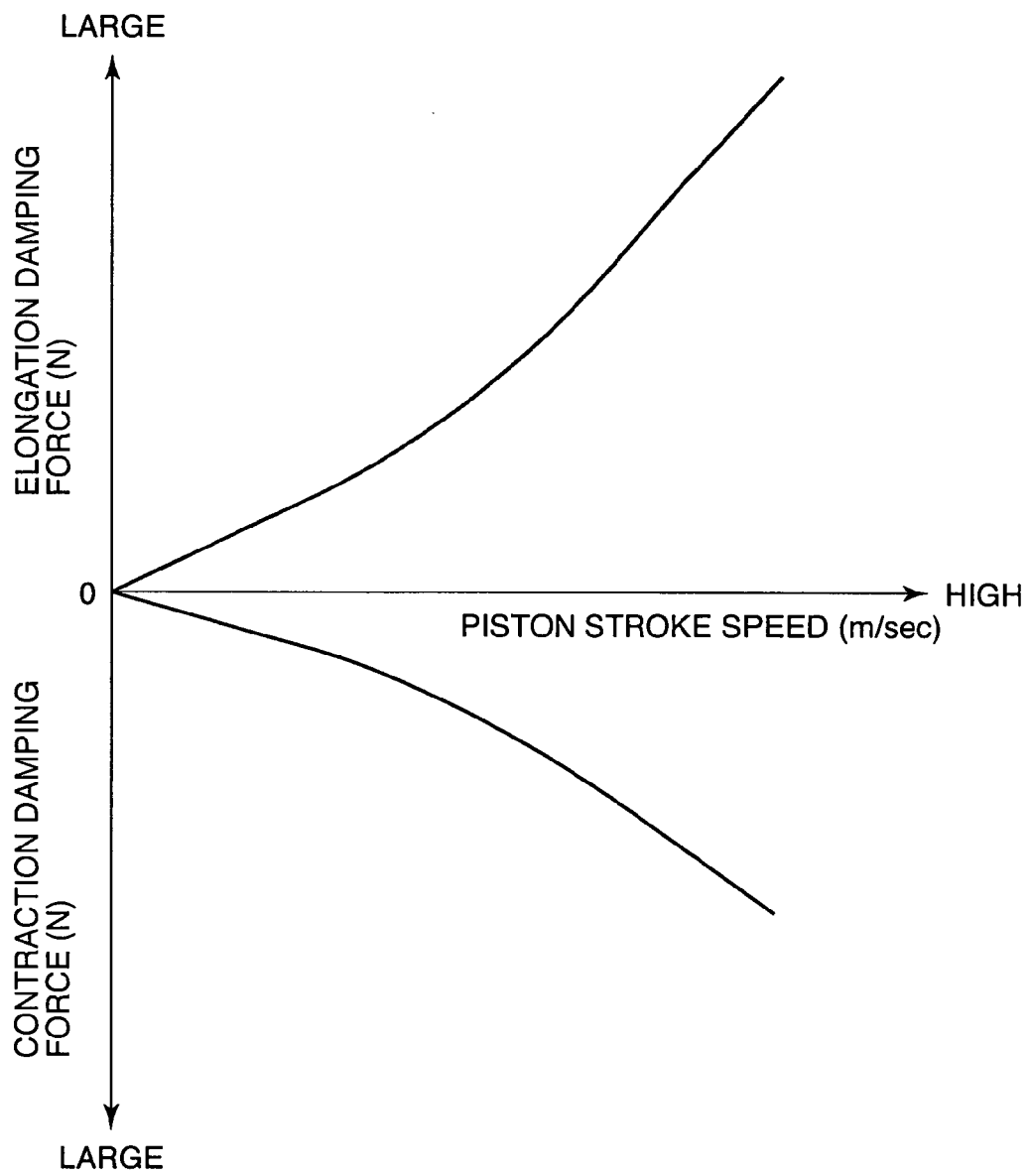
FIG. 3 is a diagram showing damping force characteristics of the hydraulic shock absorber.

Referring to FIG. 3, according to the construction described above, the hydraulic shock absorber D generates an elongation damping force that increases at a substantially constant increase rate with respect to the piston speed.

When the piston 8 strokes at a high stroke speed, or in other words when the flow rate in the oil passage is large, the characteristics of the flow resistance of the oil passage may approach orifice like two-order characteristics rather than linear characteristics. Preferably, an inner diameter of the pipe member 3 and an inner diameter of the piston rod 2 are set such that the flow resistance in the oil passage shows linear variation characteristics within a usable stroke speed region of the hydraulic shock absorber D.

In the contraction stroke of the hydraulic shock absorber D, the piston 8 moves downward in FIG. 1, the second oil chamber R2 contracts, and the first oil chamber R1 expands. The working oil in the second oil chamber R2 flows into the first oil chamber R1 via the oil passage constituted by the space 4 and the pipe member 3 as well as an oil passage constituted by the passages 8a and the leaf valve 21.

Since the leaf valve 21 is not preloaded in this hydraulic shock absorber D as described above, when the stroke speed is low, the working oil mainly flows through the shorter oil passage constituted by the passages 8a and the leaf valve 21 rather than the longer oil passage constituted by the space 4 and the pipe member 3. As the stroke speed increases, a flow rate in the oil passage constituted by the space 4 and the pipe member 3 increases with respect to a flow rate of the oil passage constituted by the passages 8a and the leaf valve 21.

In the contraction stroke of the hydraulic shock absorber D, the flow resistance is smaller in comparison with the elongation stroke since working oil can flow through the oil passage constituted by the passages 8a and the leaf valve 21. As shown in FIG. 3, accordingly, an increase rate of the generated damping force with respect to an increase in the piston speed is smaller than in the case of the elongation stroke. In the contraction stroke also, the increase rate remains substantially constant.

As described above, the hydraulic shock absorber D comprises a the pipe member 3 inserted into the piston rod 2 to form a space 4 there-between such that a long distance oil passage constituted by the pipe member 3 and the space 4 is used for a working oil flow between the first oil chamber R1 and the second oil chamber R2.

The long distance oil passage thus constructed generates a flow resistance that is proportional to a flow velocity of working oil over a wide stroke speed region. The damping force generated by the hydraulic shock absorber D in the elongation and contraction directions can be made substantially proportional to the stroke speed so as to vary in a linear mode over a wide stroke speed region.

Further, by making the long oil passage a major source for the damping force of the hydraulic shock absorber D, a required damping force can be generated without using a complicated damping valve such as a laminated leaf valve. The hydraulic shock absorber D is therefore simple in construction and can be manufactured at a low cost.

Further, the generated damping force of this hydraulic shock absorber D is not derived from a valve body that normally closes a passage, no instantaneous increase in the damping force occurs due to an opening delay of the valve. When a transient oscillation is input into the shock absorber when the vehicle runs over a salient, therefore, this hydraulic shock absorber D generates a damping force with a sufficiently high response to suppress the oscillation.

Since the oil passage formed in the piston rod 2 does not interrupt the stroke of the piston 8, a sufficient length of oil passage is ensured in this hydraulic shock absorber D.

Since this hydraulic shock absorber D is provided with the holder 11 between the piston rod 2 and the piston 8, it is not necessary to provide the piston rod 2 with the port 14 or a special structure for supporting the pipe member 3. Such a construction is preferable in terms of preserving a simple structure in the piston rod 2.

In this hydraulic shock absorber D, the pipe member 3 is formed from a material having a greater coefficient of linear expansion than the piston rod 2. As a temperature of the working oil increases, the length of the pipe member 3 becomes longer with respect to the length of the piston rod 2, and hence, the flow resistance in the pipe member 3 increases. Further, when the temperature of the working oil increases, a ring width of the ring-shaped cross-section of the space 4 narrows and the flow resistance in the space 4 increases.

Such an increase in the flow resistance compensates for a decrease in the flow resistance due to a decrease in a viscosity of the working oil caused by a temperature increase and brings about an effect of keeping the generated damping force of the hydraulic shock absorber D constant irrespective of the temperature of the working oil.

When this temperature compensation is not required, it is possible to fix an upper end of the pipe member 3 to the base 2c of the piston rod 2 and form a notch or hole in a side wall of the pipe member 3 at an upper part, thereby ensuring connection between the inner space of the pipe member 3 and the space 4.

Figure 4:
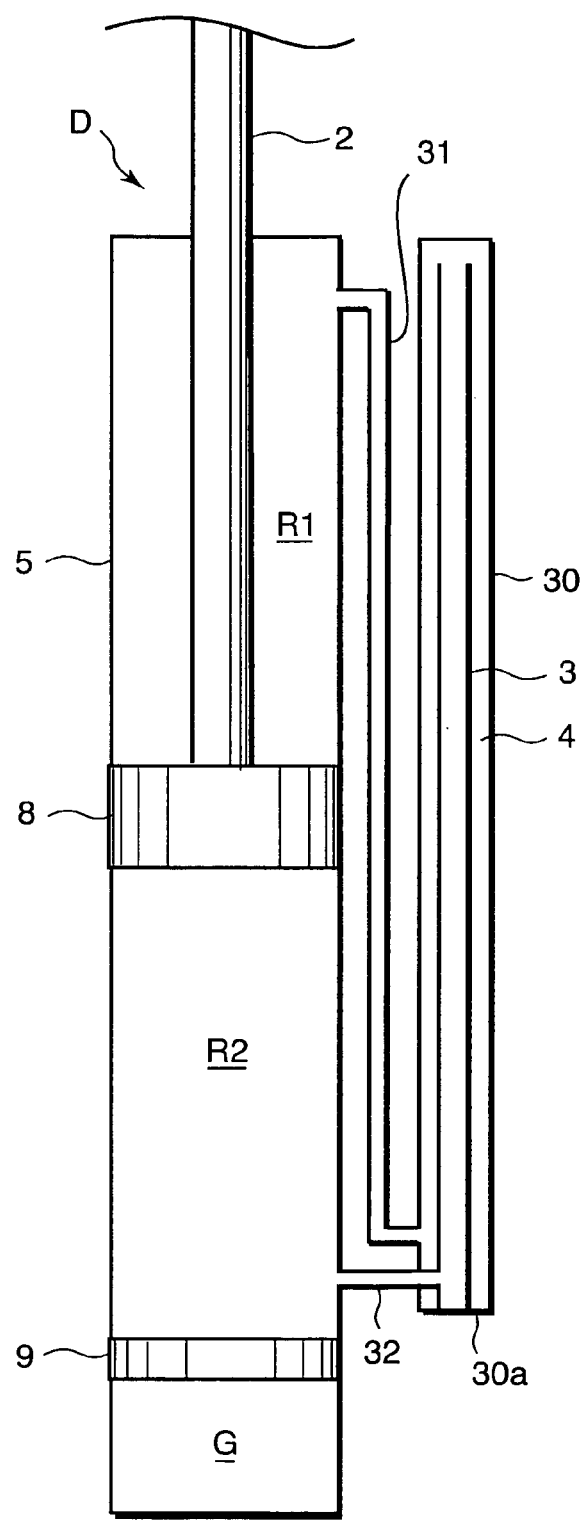
FIG. 4 is a longitudinal sectional view of a hydraulic shock absorber according to another embodiment of this invention.

Referring to FIG. 4, another embodiment of this invention will be described.

The hydraulic shock absorber D according to the first embodiment has the pipe member 3 inserted into the piston rod 2 such that the pipe member 3 and the space 4 formed in the outer space of the pipe member 3 constitute an oil passage connecting the first oil chamber R1 and the second oil chamber R2. In a hydraulic shock absorber D1 according to this embodiment, an oil passage connecting the first oil chamber R1 and the second oil chamber R2 is provided on the outside of the cylinder 5.

The construction of the hydraulic shock absorber D1 except for the oil passage is identical to that of the hydraulic shock absorber D1 according to the first embodiment.

According to this embodiment, a tightly closed cylindrical housing 30 is provided on the outside of the cylinder 5. A pipe member 3 is fixed coaxially in the cylindrical housing 30. An end of the pipe member 3 is closed by a bottom face 30a of the cylindrical housing 30. Another end of the pipe member 3 opens onto a space in the cylindrical housing 30 so as to be connected to a space 4 that is formed between the cylindrical housing 30 and the pipe member 3 and has a ring-shaped cross-section.

A lower part of the space 4 is connected to the first oil chamber R1 via a pipe conduit 31. The inner space of the pipe member 3 is connected to the second oil chamber R2 via a pipe conduit 32 connected to a lower part of the pipe member 3. The space 4 and the pipe member 3 constitute an oil passage connecting the first oil chamber R1 and the second oil chamber R2.

According to this embodiment also, preferable damping force characteristics are obtained, as in the case of the first embodiment.

The contents of Tokugan 2009-208865, with a filing date of Sep. 10, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in any of the embodiments described above, the first oil chamber R1 may be connected to the pipe member 3 while the second oil chamber R2 is connected to the space 4. The hydraulic shock absorber D or D1 may be formed as a double-rod type instead of the single-rod type.

In the first embodiment, although the holder 11 and the piston rod 2 are formed as different members, they may be formed into one piece. An opening at an end of the piston rod 2 is narrowed to form a fitting part that retains the pipe member 3. A hole is formed through a side wall of the piston rod 2 as the port 14 connecting the first oil chamber R1 and the space 4.

In any of the embodiments described above, any aqueous liquid can be used as a fluid instead of the working oil. Further, a compressive gaseous fluid may be used as a fluid for the shock absorbers D and D1. The piston rod 2 in the first embodiment and the housing 30 in the second embodiment that serve as a housing to accommodate the pipe member 3 may not necessarily be formed to have a circular cross-section. They may be formed to have any polygonal or oval cross-section as long as it can accommodate the pipe member 3 while ensuring a space 4 there-between.

What is claimed is:

1. A fluid pressure shock absorber, comprising:
a cylinder filled with a fluid;
a piston that is accommodated in the cylinder so as to be free to slide and partitions a first fluid chamber and a second fluid chamber in the cylinder;
a housing; and
a pipe member inserted into the housing so as to form a space between the pipe member and the housing,
wherein the pipe member connects one of the first fluid chamber and the second fluid chamber with the space directly without passing through a valve, while the space is connected directly to the other of the first fluid chamber and the second fluid chamber, and
the shock absorber further comprises a holder which an end of the pipe member penetrates via a gap such that the pipe member is movable axially and radially within a range that the gap allows.

2. The fluid pressure shock absorber as defined in claim 1, wherein the pipe member has two ends, one end of the pipe member being connected to the one of the first fluid chamber and the second fluid chamber, and the other end of the pipe member being connected to the space.

3. The fluid pressure shock absorber as defined in claim 1, wherein the housing comprises a piston rod that is fixed to the piston and projects outside from the cylinder.

4. The fluid pressure shock absorber as defined in claim 1, wherein the shock absorber performs an elongation and a contraction as the piston slides in the cylinder, and when the shock absorber performs the elongation and the contraction, the pipe member and the space between the pipe member and the housing form a fluid flow passage to generate an energy loss corresponding to a sum of an energy loss that is generated when the fluid passes through the pipe member and an energy loss that is generated when the fluid passes through the space.

5. The fluid pressure shock absorber as defined in claim 1, wherein the holder is formed into a cylindrical shape and has a base that is screwed onto the piston rod and a tip that penetrates the piston, and the shock absorber further comprises a nut screwed onto the tip penetrating the piston.

6. The fluid pressure shock absorber as defined in claim 5, wherein the holder has a port connecting the pipe member to the other of the first fluid chamber and the second fluid chamber.

7. The fluid pressure shock absorber as defined in claim 6, wherein the other of the first fluid chamber and the second fluid chamber is the first fluid chamber that is formed in the cylinder around the piston rod and the one of the first fluid chamber and the second fluid chamber is the second fluid chamber that is formed on the opposite side of the piston to the piston rod.

8. The fluid pressure shock absorber as defined in claim 7, wherein the pipe member is connected to the second fluid chamber via a through-hole formed in the nut.

9. The fluid pressure shock absorber as defined in claim 1,
wherein a linear expansion coefficient of the pipe member is set to be greater than a linear expansion coefficient of the housing.

10. The fluid pressure shock absorber as defined in claim 1, wherein the shock absorber performs an elongation and a contraction as the piston slides in the cylinder, and the shock absorber further comprises:
a bypass passage that bypasses an oil passage constituted by the pipe member and the space to connect the first fluid chamber and the second fluid chamber; and
a valve that allows a fluid to flow in the bypass passage only when the shock absorber undergoes a contraction.

11. A fluid pressure shock absorber, comprising:
a cylinder filled with a fluid;
a piston that is accommodated in the cylinder so as to be free to slide and partitions a first fluid chamber and a second fluid chamber in the cylinder;
a housing; and
a pipe member inserted into the housing so as to form a space between the pipe member and the housing,
wherein the pipe member connects one of the first fluid chamber and the second fluid chamber with the space directly without passing through a valve, while the space is connected directly to the other of the first fluid chamber and the second fluid chamber, and
wherein the housing is provided on the outside of the cylinder.

* * * * *